(12) United States Patent
Schrage (10) Patent No.: US 11,423,006 B1
(45) Date of Patent: Aug. 23, 2022

(54) BLOCKCHAIN-BASED ANALYSIS OF LOCALLY CONFIGURED DATA

(71) Applicant: SAP SE, Walldorf (DE)

(72) Inventor: Jan Schrage, Helmstadt-Bargen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/184,335

(22) Filed: Feb. 24, 2021

(51) Int. Cl.
| | |
|---|---|
| G06F 16/00 | (2019.01) |
| G06F 16/23 | (2019.01) |
| H04L 9/06 | (2006.01) |
| G06F 16/21 | (2019.01) |
| G06F 16/27 | (2019.01) |
| H04L 9/00 | (2022.01) |

(52) U.S. Cl.
CPC ........ *G06F 16/2358* (2019.01); *G06F 16/212* (2019.01); *G06F 16/219* (2019.01); *G06F 16/27* (2019.01); *H04L 9/0643* (2013.01); *H04L 9/50* (2022.05)

(58) Field of Classification Search
CPC .. G06F 16/2358; G06F 16/212; G06F 16/219; G06F 16/27; H04L 9/0643; H04L 2209/38
See application file for complete search history.

(56) References Cited

U.S. PATENT DOCUMENTS

| | | | | |
|---|---|---|---|---|
| 8,849,764 B1* | 9/2014 | Long | ................... | G06F 11/1469 |
| | | | | 707/646 |
| 9,244,958 B1* | 1/2016 | MacCanti | ............. | G06F 16/273 |
| 2015/0286409 A1* | 10/2015 | Chandra | ............... | G06F 3/0629 |
| | | | | 711/170 |
| 2015/0319158 A1* | 11/2015 | Kumnick | ........... | G06Q 20/4016 |
| | | | | 726/9 |
| 2019/0174514 A1* | 6/2019 | Ramesh | .................. | G06Q 10/02 |
| 2020/0097354 A1* | 3/2020 | Barnett | ............... | G06F 16/2365 |
| 2020/0250698 A1* | 8/2020 | Larimer | ............. | G06Q 30/0214 |
| 2020/0285654 A1* | 9/2020 | Huang | ................ | H04L 67/1097 |

OTHER PUBLICATIONS

Skelton, "Payroll software provider pilots use of blockchain in human resources," downloaded from: https://www.computerweekly.com/news/252461189/Payroll-software-provider-pilots-use-of-blockchain-in-human-resources, 3 pages (document published Apr. 5, 2019; downloaded Aug. 26, 2020).

* cited by examiner

*Primary Examiner* — Alexander Khong
(74) *Attorney, Agent, or Firm* — Klarquist Sparkman, LLP (57) ABSTRACT

Systems, methods, and computer media are described for storing and analyzing locally configured data. Both locally configured data and the corresponding data configurations are stored in a distributed storage platform (e.g., a blockchain). Using an accompanying data configuration to interpret and analyze stored data, accurate and meaningful local and global analyses can be performed, across data from different domains, without prior knowledge or external definition of the data. Storage in a distributed storage platform ensures that data cannot be modified and that all transactions are recorded. Example analyses that can be conducted on the stored locally configured data include audits, searching for variances, general queries for data having certain parameters or values, etc.

18 Claims, 10 Drawing Sheets

EMPLOYEE FAMILY MEMBER DATA CONFIGURATION - ARGENTINA

```
{
"type": "employee_config",
"category": "family_member",
"country": "AR",
"label": "Family Member",
"changed_on": "Tue, 11 Feb 2020 10:51:52 GMT",
"changed_by": "I382790",
"fields": [{    "name": "relationship",
                "type": "text",
                "label": "Relationship (spouse,
                child,...)" },
          {     "name": "gender",
                "type": "text",
                "label": "Gender" },
          {     "name": "name",
                "type": "text",
                "label": "Name" },
          {     "name": "nationality",
                "type": "text",
                "label": "Nationality" },
          {     "name": "child_allowance",
                "type": "number",
                "label": "Child allowance" },
          {     "name": "valid_from",
                "type": "date",
                "label": "Valid From" }
          ]
}
```

400

EMPLOYEE FAMILY MEMBER DATA - ARGENTINA

```
{
"type": "employee_data",
"employee": "122344",
"country": "AR",
"category": "family_member",
"changed_on": "01 Mar 2020",
"changed_by": "I333333",
"data": {
        "relationship": "child",
        "gender": "f",
        "name": "Mercedes Gardel",
        "nationality": "AR",
        "child_allowance": 1225.25,
        "valid_from": "20 Feb 2020"
        }
}
```

```
EMPLOYEE FAMILY MEMBER DATA
   CONFIGURATION - ITALY

{
"type": "employee_config",
"category": "family_member",
"country": "IT",
"label": "Family Member",
"changed_on": "Tue, 11 Feb 2020 10:51:52 GMT",
"changed_by": "I382790",
        "fields": [{    "name": "relationship",
                        "type": "text",
                        "label": "Relationship
                (spouse,child,...)" },
                {       "name": "gender",
                        "type": "text",
                        "label": "Gender" },
                {       "name": "name",
                        "type": "text",
                        "label": "Name" },
                {       "name": "nationality",
                        "type": "text",
                        "label": "Nationality" },
                {       "name":
"taxpayer_reference",
                        "type": "text",
                        "label": "Taxpayer's
                reference tax code" },
                {       "name":
"inheritance_entitlement",
                        "type": "text",
                        "label": "Inheritance
                entitlement" },
                {       "name":
"inheritance_severance",
                        "type": "text",
                        "label": "Inheritance
                entitlements for severance pay" },
                {       "name": "valid_from",
                        "type": "date",
                        "label": "Valid From" }
                ]
}

500
```

```
EMPLOYEE FAMILY MEMBER DATA
            - ITALY

{
"type": "employee_data",
"employee": "123456",
"country": "IT",
"category": "family_member",
"changed_on": "01 Mar 2020",
"changed_by": "I333333",
"data": { "relationship": "child",
        "gender": "m",
        "name": "Andrea Borgia",
        "nationality": "IT",
        "taxpayer_reference": "BRG NDR
96B11 L219F",
        "inheritance_entitlement": "25%",
        "inheritance_severance": "12.5%",
        "valid_from": "20 Feb 2020"}
}

PROCESS CONFIGURATION

{
  "type": "process_config",
  "category": "payroll",
  "country": "US",
  "process": "payroll_us",
  "label": "Payroll US",
  "periodicity": "monthly",
  "grace_period": 20,
  "valid_from": "01.01.2020",
  "valid_to": "01.01.2030",
  "changed_on": "Wed, 12 Feb 2020 11:51:52 GMT",
  "changed_by": "I382790"
}

600

PROCESS INSTANCE

{
  "type": "process_instance",
  "process": "payroll_us",
  "for_period": "01.2020",
  "started_on": "26 Jan 2020"
}

VARIANCE REPORT DATA CONFIGURATION

```
{
"type": "process_component_data_config",
"category": "payroll_reporting",
"step": "payroll_us_variance",
"changed_on": "Wed, 12 Feb 2020 11:51:52 GMT",
"changed_by": "I382790",
"fields":
        {
        "name": "variance_data",
        "data": "array",
        "header": ["Wage Type", "Pay Element", "Current Month", "Previous Month","Variance","%"],
        "label": "Variance current/prev. month"
        }
}
```

700

VARIANCE REPORT DATA

```
{
"type": "step_data_instance",
"process": "payroll_us",
"for_period": "01.2020",
"step": "payroll_us_variance",
"reference": 1,
"changed_on": "01 Mar 2020",
"changed_by": "I387262",
"data":
        {
        [["M934","Housing Allowance","19221.34","5436.13","13785.21"," 253.58"],
        ["/ 854","Advances","0","3 2445.45","-32445.45"," -100"],
        ["/ 101","Monthly Salary","678599.22","6 32233.21","46366.01"," 7.33"]]
        }
}
```

BLOCKCHAIN-BASED ANALYSIS OF LOCALLY CONFIGURED DATA

BACKGROUND

Organizations are becoming increasingly global in scope. Software applications are typically used by different groups across organizations and in different parts of the world. Analyzing data used in such applications can be difficult.

DETAILED DESCRIPTION

The examples described herein generally store and analyze locally configured data. Conventionally, different domains (e.g., units of an entity, subsidiaries of an entity in different countries, etc.) typically have different requirements or preferences for which aspects of data are stored and used for various purposes. Different domains can also have localized processes. Disparate data features, process features, and storage practices make data analysis across domains difficult and potentially unreliable.

The examples described herein store both locally configured data and the corresponding data configurations in a distributed storage platform (e.g., a blockchain or distributed ledger). Using a stored data configuration to interpret and analyze stored data, accurate and meaningful local and global analyses can be performed without prior knowledge or external definition of the data. Example analyses include audits, searching for variances (e.g., data values or changes in data values in excess of an expected threshold), general queries for data having certain parameters or values, etc.

In contrast to the described examples, traditional distributed storage platforms typically only store data, and the format of the data is either globally defined and known or stored separately from the platform. Further, the immutability of a distributed storage platform such as a blockchain ensures that data and transaction history cannot be changed without leaving a record of the change, which is particularly beneficial for audits, financial data, or confidential/sensitive data.

As a specific example, a multi-national entity such as a corporation or organization might have operations in many countries. Various processes and data relevant to one country may or may not be relevant in other countries. For example, payroll data and processes across the various countries might include different (or no) social insurance deductions or contributions, different types and amounts of local, state, and national tax, different currency units, different pay frequency, etc. Using the described examples, the operations in the respective countries can store configuration data defining the appropriate payroll data parameters for that country in the blockchain along with the payroll data itself. This allows a global analysis (e.g., an audit of payroll across countries) to be performed even though the local data configurations for each country may be different.

The described examples also increase the efficiency of analysis applications and systems. In a conventional arrangement, more computing resources are likely required to run and rerun analyses because of inconsistent data formats, to convert or reformat data, and to validate unclear results. Examples are described below with reference to FIGS. 1-10.

Figure 1:
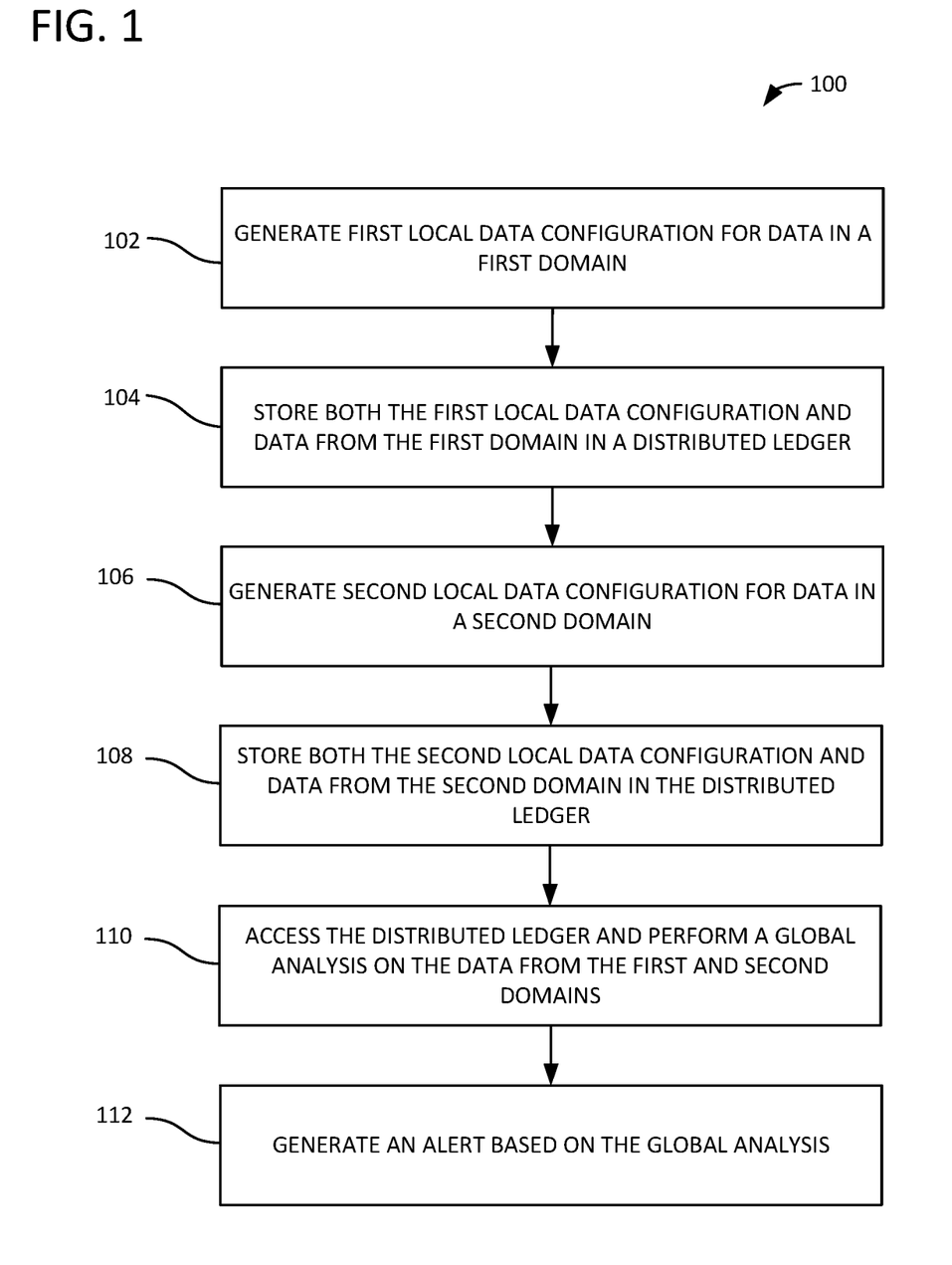
FIG. 1 illustrates an example method of analyzing locally configured data.

FIG. 1 illustrates a method 100 of analyzing locally configured data. In process block 102 a first local data configuration is generated for data in a first domain. As used herein, a domain refers to a unit (e.g., of an organization, corporation, entity, or other group), subdivision, subsidiary, geographic area, network, or other division. The first local data configuration is specific to the first domain and defines one or more parameters (also referred to herein as "fields") of the corresponding data.

Figure 2:
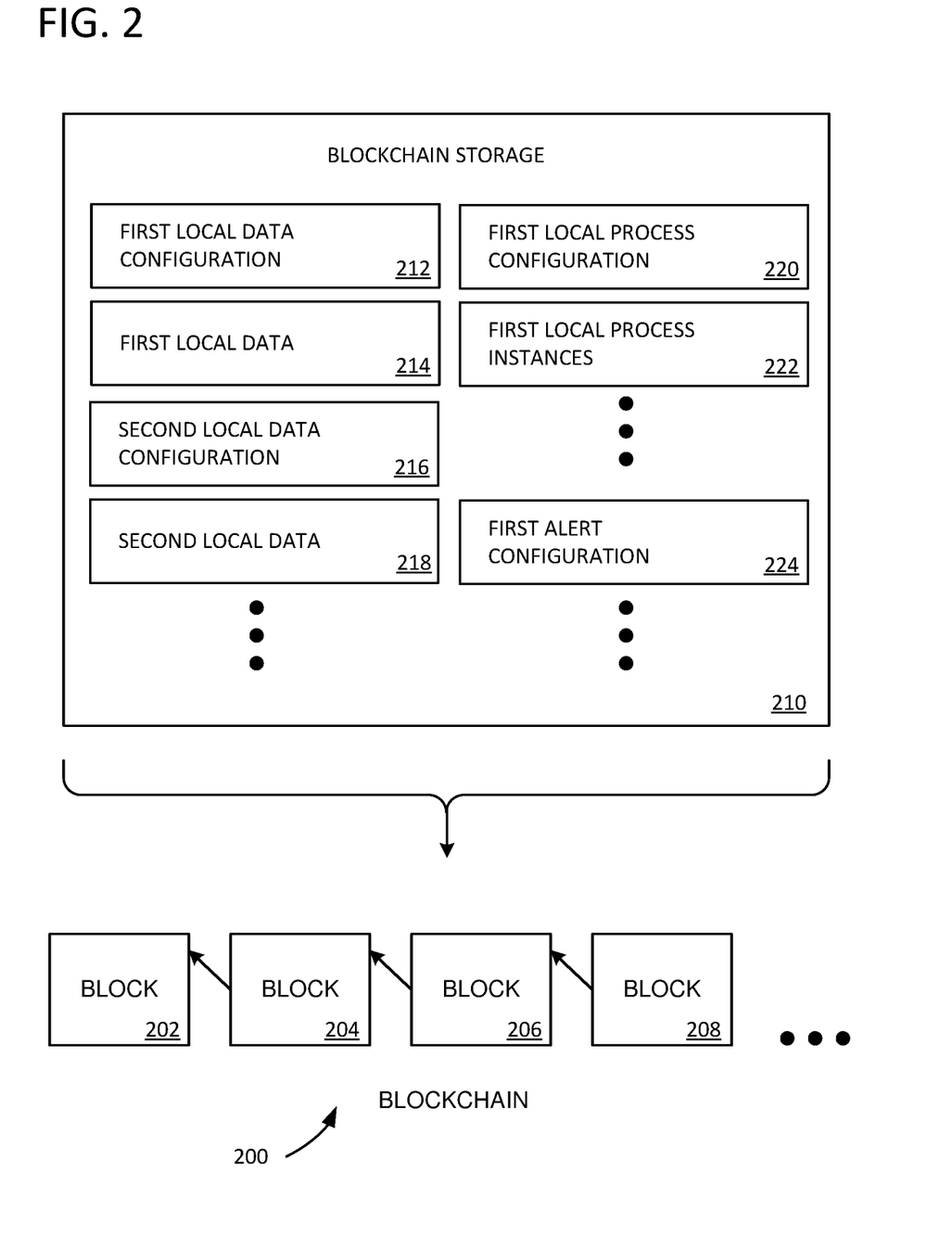
FIG. 2 is an example blockchain storage storing locally configured data and local data configurations.

In process block 104, both the first local data configuration and data from the first domain are stored in a distributed storage platform. The data from the first domain conforms to the first local data configuration. A distributed storage platform uses distributed devices and storage locations to replicate and synchronize data and establish a consensus between nodes. This arrangement provides security via consensus and also eliminates the need for centralized management. Blockchain, discussed in more detail with reference to FIG. 2, is one type of distributed storage platform technology. The examples herein are discussed with respect to blockchain but can be implemented using other distributed storage platforms.

In process block 106, a second local data configuration is generated for a second domain. The first and second domains can be, for example, countries. An organization can have, for example, a subsidiary or subdivision in multiple countries, such as Canada and Germany, and software applications used in the respective countries for various purposes (e.g., payroll, inventory tracking, financial information, workforce management, compliance, etc.) can store data having a configuration appropriate for the respective country.

Both the second local data configuration and data from the second domain are stored in the distributed storage platform in process block 108. The data from the second domain conforms to the second local data configuration. The first and second local data configurations define one or more parameters of the corresponding data from the first and second domains.

The distributed storage platform is accessed, and a global analysis is performed on the data from the first domain and the data from the second domain, in process block 110. The distributed storage platform can be accessed, for example, through a user interface. The user interface can include various components such as: a blockchain viewer tool through which individual blocks in a blockchain can be examined; an audit tool, through which parameters of an audit can be defined and executed; a process monitor tool, through which the status and outcome of various local processes can be viewed; an alert tool, through which alert thresholds can be defined and alerts that have been generated can be viewed and approved or denied; and various other tools. The user interface can also include graphical tools such as a geographic map that can show countries, states, regions, counties, etc. where items have been identified during an audit or other global analysis.

The global analysis is an analysis performed on data from multiple domains. In the context of method 100, the analysis is performed on data from the first and second domains. The global analysis can be an audit (e.g., verifying that particular events have occurred, examining payroll figures, etc.). The global analysis can also be a variance report identifying data values or changes in data values in excess of an expected threshold or a general query for data having certain parameters or values. Processes can also be analyzed through a global analysis (e.g., identifying the status of a manufacturing process or payroll process in various domains). Other examples of global analyses include using machine learning tools to identify potential fraud patterns based on payment data, identifying suspicious bank account usage (e.g., a large number of people in one account, information changes made before a large payment, etc.), fraud investigations (e.g., identity theft), budget tracking, hiring trend analysis, etc.

In performing the global analysis, the data from the first domain is evaluated using the first local data configuration, and the data from the second domain is evaluated using the second local data configuration. For example, in determining if a local process has been completed, the first domain might record this through a "completion" parameter with a "yes/no" value while the second domain might record this through a "status" parameter with "complete/incomplete" values. After accessing the local configurations, the appropriate information can be extracted and interpreted. In examples where data from a third (or fourth, fifth, etc.) domain is stored in the distributed storage platform, that additional data is likewise evaluated using the corresponding stored local data configuration. In some examples, the local data configurations for two or more domains can be the same (e.g., two different countries with similar requirements), but the configurations are still locally defined and stored along with the corresponding data in the distributed storage platform.

In process block 112, an alert is generated based on the global analysis. Alerts are discussed in more detail with reference to FIG. 6. Generally, alerts can be configured to compare one or more parameters against an alert condition or threshold, and the alert is generated when the condition or threshold is met. The alert can also be based on a calculation using one or more parameters of the data from the first or second domains (e.g., when the sum of parameters one and two exceed a threshold). The alerts can be presented through, for example, a user interface as discussed with respect to process block 110. Alerts can also be emailed, pushed through an application, or otherwise provided to responsible parties or other applications.

FIG. 2 illustrates an example blockchain 200. As used herein, "blockchain" refers to a distributed storage platform and network in which individual "blocks" are connected in a chain. Blocks are stored on nodes, which can be various distributed computing devices. Each block is linked to the previous block in the blockchain by, for example, including a hash of the previous block (referencing the previous block). Various hash functions, including functions in the Secure Hash Algorithm (SHA)-1 or -2 families, such as SHA-256, can be used to perform a one-way hash. For a one-way hash, it is generally considered to be impossible or impractical to generate the input (the "message") to the hash function based on the output (the "message digest" or "digest") of the hash function. Each block also contains a timestamp of the current transaction. In FIG. 2, blocks 202, 204, 206, and 208 form blockchain 202 that contain blockchain storage 210.

Blockchain 202 can be implemented using a number of blockchain frameworks, including MultiChain, which is a platform used to establish private blockchains that has an API and a command line interface. Other blockchain frameworks include Hyperledger Fabric, which is a modular blockchain framework that acts as a foundation for developing blockchain-based products, solutions, and applications, and Quorum, which enables enterprises to leverage Ethereum for blockchain applications.

Blockchain storage 210 includes a first local data configuration 212, first local data 214, second local data configuration 216, and second local data 218 (and other local data configurations and local data, not shown). Blockchain storage 210 also includes a first local process configuration 220, first local process instances 222, and first alert configuration 224. Example data, data configurations, process configurations, and process instances are shown in FIGS. 4-7. An example alert configuration is discussed in detail with respect to FIG. 8.

Figure 3:
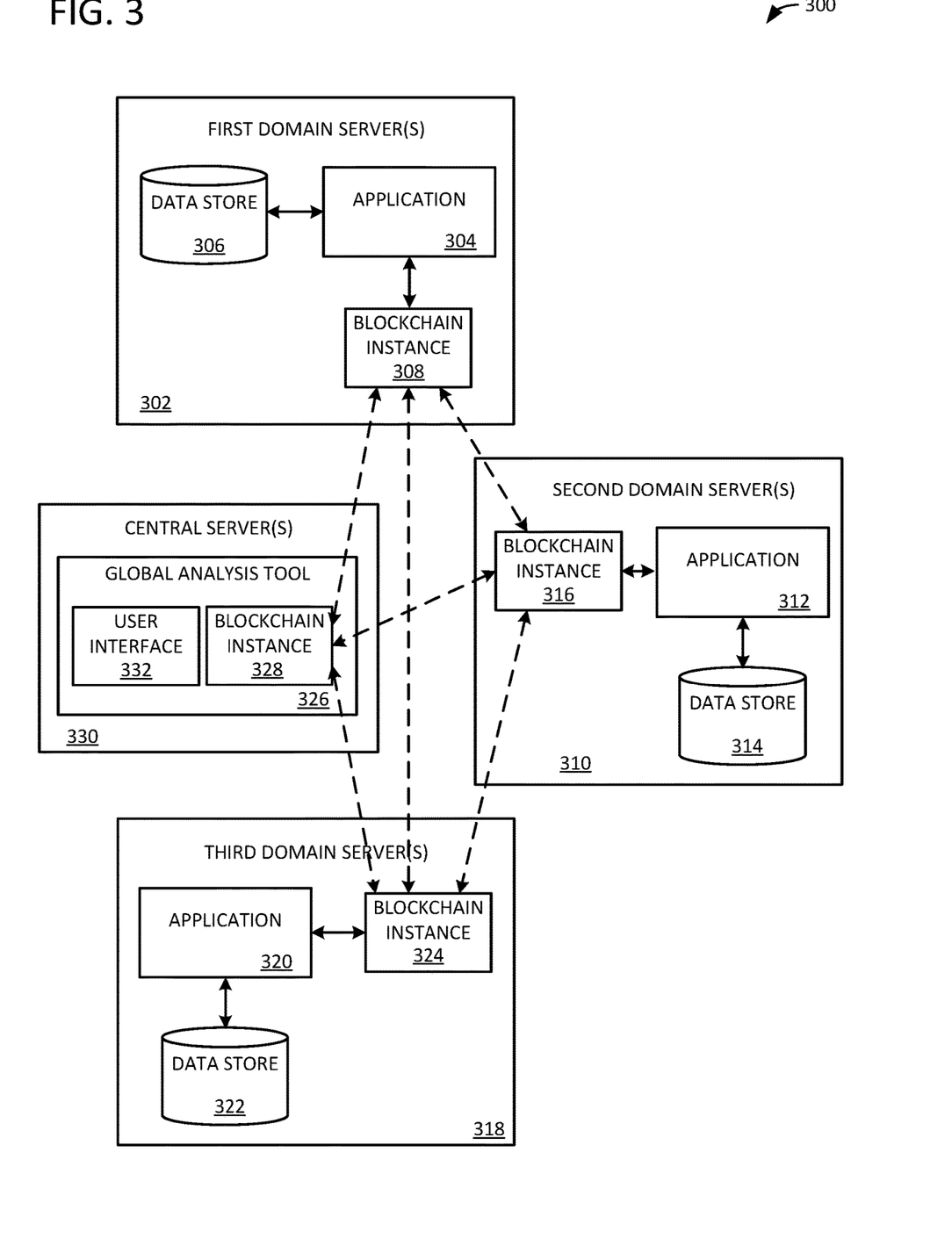
FIG. 3 illustrates an example blockchain-based global analysis system.

FIG. 3 illustrates an example system 300 configured to implement the described examples, including method 100. First domain server(s) 302 implements an application 304 and a data store 306 for the first domain. Various local data used, collected, and/or generated by application 304 is stored in blockchain instance 308 along with configurations for the data. Data store 306 can also store the data stored in blockchain instance 308 or can store intermediate, precursor, and/or associated data. A corresponding arrangement exists with second domain server(s) 310, application 312, data store 314, and blockchain instance 316 and third domain server(s) 318, application 320, data store 322, and blockchain instance 324.

A global analysis tool 326 also contains a blockchain instance 328. Blockchain instances 308, 316, 324, and 328 each contain all of the data stored in the blockchain by the respective servers. Blockchain instances can also be referred to as "nodes" in a network context. In FIG. 3, the interconnection of the blockchain instances is shown with dashed lines. Global analysis tool 326 accesses blockchain instance 328 to perform global analyses (e.g., audits, variance reports, queries, etc.) on the data (and data configurations) stored in the blockchain by first domain server(s) 302, second domain server(s) 310, and third domain server(s) 318. Global analysis tool 326 can be implemented on a separate server or series of servers, as shown in FIG. 3 on central server(s) 330, or global analysis tool 326, or some or all of the functionality of global analysis tool 326, can be included in applications 304, 312, and 320 or otherwise be implemented on the servers of the respective domains and the respective domains can access and use global analysis tool 326.

Global analysis tool 326 can also include user interface 332. User interface 332 allows users to select domains and/or parameters of interest, specify dates or processes of interest, or otherwise specify information to retrieve from a blockchain instance and an analysis to perform. User interface 332 can also display analysis results and alerts. For example, the status of a payroll process in different domains can be queried through user interface 332, and a table or list of statuses can be generated displaying the status and corresponding visual indicator (e.g., late=red, open=yellow, upcoming=blue, closed=green, etc.). Alerts can also be presented as a separate dialog box or pop-up window or can be emailed directly to responsible parties (e.g., a manager). Alerts can specify an action to take (e.g., "approval/override needed") or can simply indicate that a threshold has been exceeded or a condition has been met (e.g., "parameter X has been exceeded by Y %").

Figure 4:
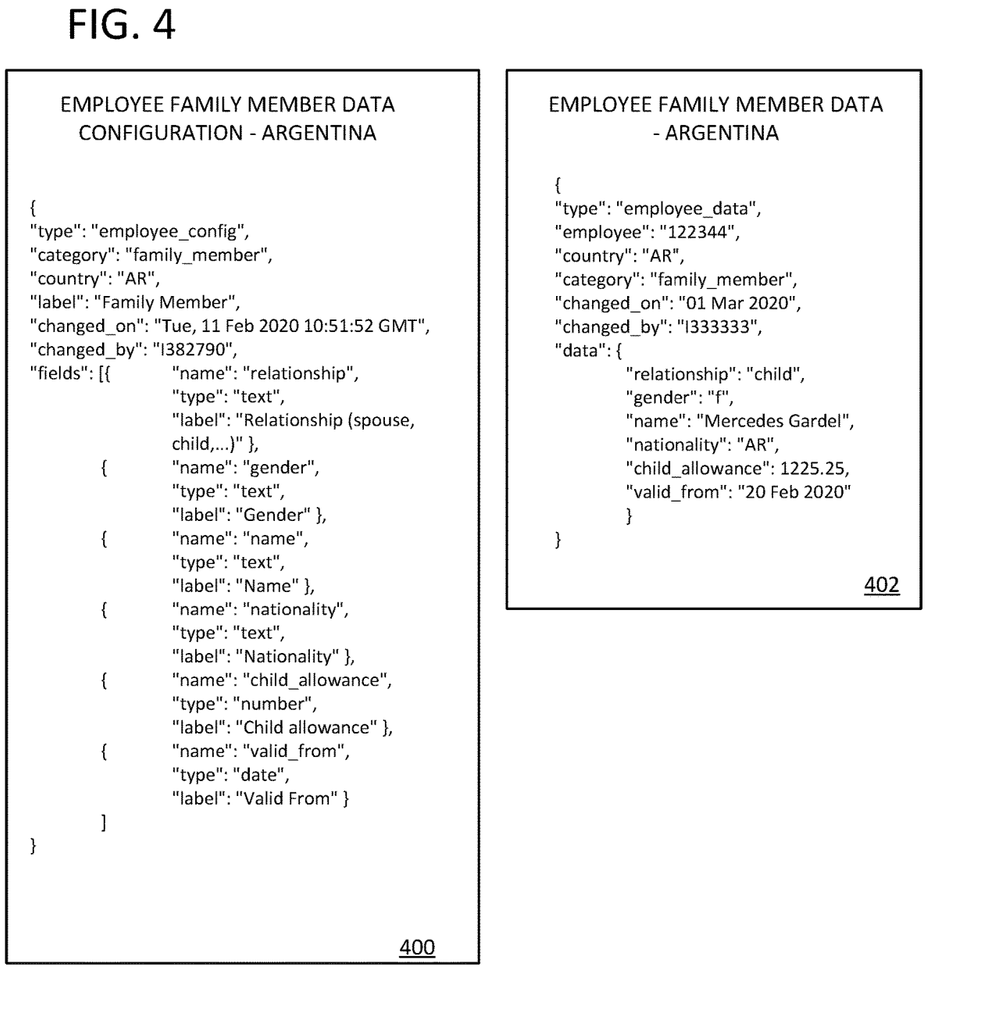
FIG. 4 illustrates example locally configured data and local data configurations for a first geographic area.
Figure 5:
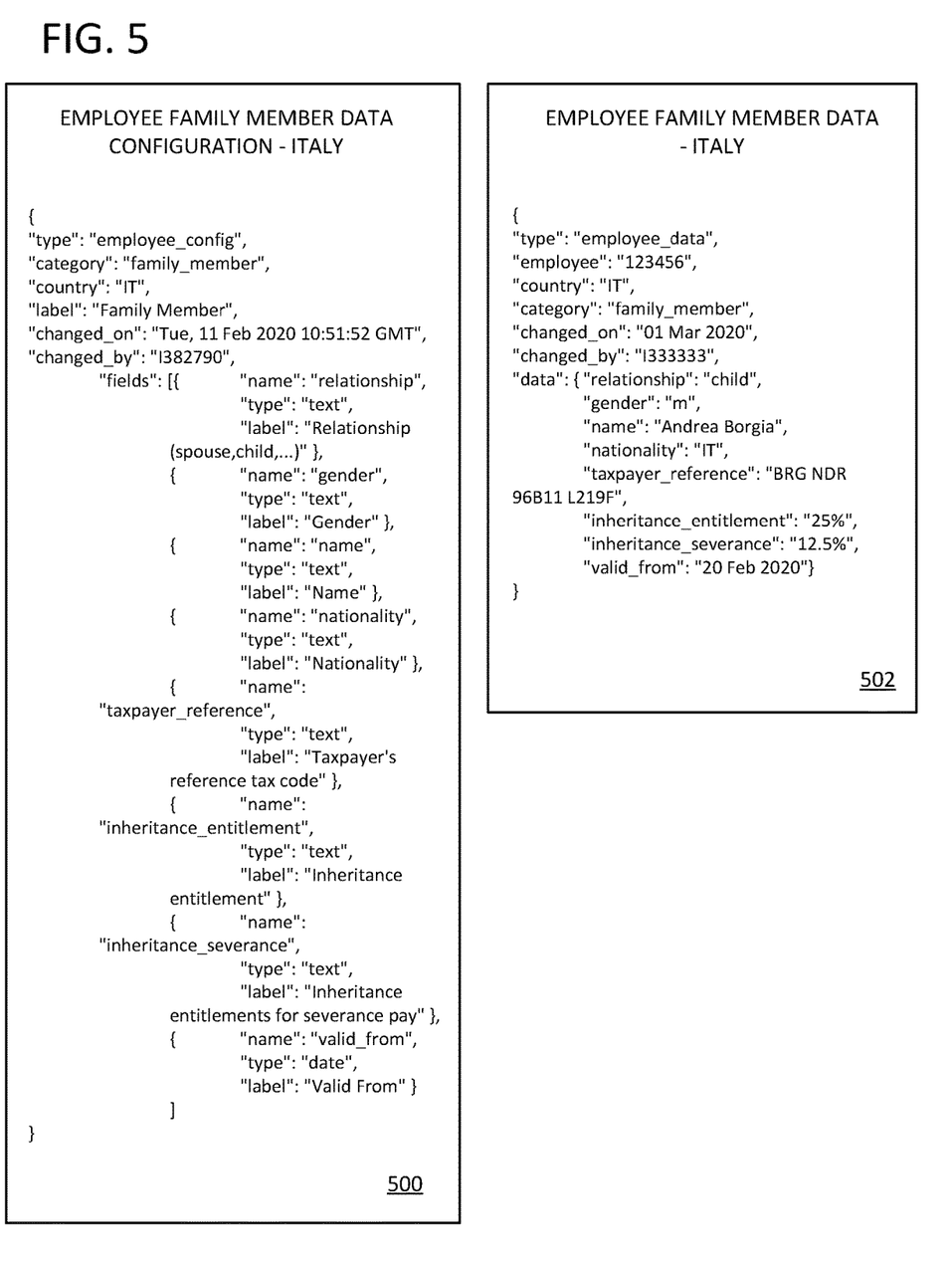
FIG. 5 illustrates example locally configured data and local data configurations for a second geographic area.
Figure 6:
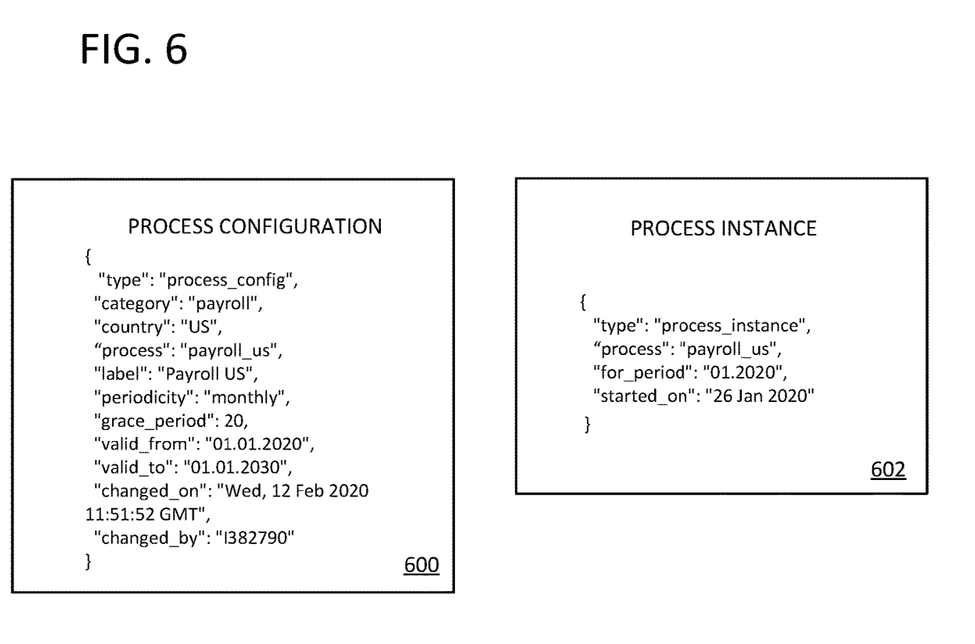
FIG. 6 illustrates an example local process configuration and local process instance.

FIG. 4 illustrates an employee family member data configuration 400 for a geographic area (Argentina) and corresponding locally configured employee family member data 402 that are stored in a blockchain. Together, configuration 400 and data 402 form a data structure. FIG. 5 illustrates an employee family member data configuration 500 for a different geographic area (Italy) and corresponding locally configured employee family member data 502. Example data structures can also include process configurations and process instances, examples of which are shown in FIG. 6. In some examples, process configurations and instances form a separate data structure.

Returning to FIG. 4, employee family member data configuration 402 includes parameters such as "type," "category," "country," "label," "changed_on" (date), "changed_by" (user ID), etc. Employee family data configuration 400 also defines the parameters of "relationship," "gender," "nationality," etc. including a name, type, and label for each (listed under "fields"). Employee family member data 402 conforms to employee family member data configuration 400 and includes parameter values for the parameters defined in employee family member data configuration 400. Although shown in FIG. 4, employee family member data configuration 400 and employee family member data 402 are also reproduced below:

```
{
"type": "employee_config",
"category": "family_member",
"country": "AR",
"label": "Family Member",
"changed_on": "Tue, 11 Feb 2020 10:51:52 GMT",
"changed_by": "I382790,
"fields": [{      "name": "relationship",
                  "type": "text",
                  "label": "Relationship (spouse,child, . . .)" },
        {         "name": "gender",
                  "type": "text",
                  "label": "Gender" },
        {         "name": "name",
                  "type": "text",
                  "label": "Name"
        {         "name": "nationality",
                  "type": "text",
                  "label": "Nationality" },
        {         "name": "child_allowance",
                  "type": "number",
                  "label": "Child allowance" },
        {         "name": "valid_from",
                  "type": "date",
                  "label": "Valid From" }
        ]
}
{
"type": "employee_data",
"employee": "122344,
"country": "AR",
"category": "family_member",
"changed_on": "01 Mar 2020",
"changed_by": "I333333",
"data": {
        "relationship": "child",
        "gender": "f",
```

```
        "name": "Mercedes Gardel",
        "nationality": "AR",
        "child_allowance": 1225.25,
        "valid_from": "20 Feb 2020"
        }
}
```

FIG. 5 illustrates an employee family member data configuration 500 and employee family member data 502 for a different geographic area—Italy. Data configuration 500 and data 502 are reproduced below:

```
{
"type": "employee_config",
"category": "family_member",
"country": "IT",
"label": "Family Member",
"changed_on": "Tue, 11 Feb 2021 10:51:52 GMT",
"changed_by": "I382790",
"fields": [{      "name": "relationship",
                  "type": "text",
                  "label": "Relationship (spouse,child, . . .)"
        {         "name": "gender",
                  "type": "text",
                  "label": "Gender" },
        {         "name": "name",
                  "type": "text",
                  "label": "Name" },
        {         "name": "nationality",
                  "type": "text",
                  "label": "Nationality" },
        {         "name": "taxpayer_reference",
                  "type": "text",
                  "label": "Taxpayer's reference tax code" },
        {         "name": "inheritance_entitlement",
                  "type": "text",
                  "label": "Inheritance entitlement" },
        {         "name": "inheritance_severance",
                  "type": "text",
                  "label": "Inheritance entitlements for severance pay" },
        {         "name": "valid_from",
                  "type": "date",
                  "label": "Valid From" }
        ]
}
{
"type": "employee_data",
"employee": "123456,
"country": "IT",
"category": "family_member",
"changed_on": "01 Mar 2021",
"changed_by": "I333333",
"data": {         "relationship": "child",
        "gender": "m",
        "name": "Andrea Borgia",
        "nationality": "IT",
        "taxpayer_reference": "BRG NDR 96B11 L219F",
        "inheritance_entitlement": "25%",
        "inheritance_severance": "12.5%",
        "valid_from": "01 Feb 2016"}
}
```

As can be seen from the Argentinian examples in FIG. 4 and the Italian examples in FIG. 5, although some of the information stored for the two countries is similar, there are variations in the fields that are difficult to understand or properly process without the configuration being stored with the data. The Argentinian configuration, configuration 400, for example, has a "Child allowance" field, whereas the Italian configuration, configuration 500, has an "Inheritance entitlement" field and an "Inheritance entitlements for severance pay" field. Such configuration differences can be driven by differences is national laws, different corporate or organizational requirements, different regional customs, etc.

FIG. 6 illustrates a process configuration 600 and a process instance 602. Process configuration 600 defines various parameters for a payroll process, including a "process" value of "payroll_us," with a "periodicity" of "monthly," as well as a "type," "country," "grace_period," etc. Process instance 602 conforms to process configuration 404. Process instance 602 represents a particular instance of a payroll process (i.e., payroll for January 2020) defined in process configuration 600. Process instance 602 includes "type" ("process_instance"), "process" ("payroll_us"), "for period" ("01.2020"), and "started_on" ("26 Jan. 2020") parameters.

Processes can also be subdivided into components, and process component configurations and process component instances can be stored in the blockchain. For example, a payroll process might have the steps of payroll run, variance report, and signoff. An example process component configuration for the variance report is as follows:

```
{
"type": "process_component_config",
"process": "payroll_us",
"step": "payroll_us_variance",
"label": "Variance Report",
"previous_componemt": "payroll_us_run",
"valid_from": "01.01.2020",
"valid_to": "01.01.2030",
"changed_on": "Wed, 12 Feb. 2020 11:51:52 GMT",
"changed_by": "I382790"
}
```

A corresponding process component instance is as follows:

```
{
"type": "component_instance",
"for_period": "01.2020",
"step": "payroll_us_variance",
"execution_date": "29 Jan. 2020",
"result": "successful",
"index": 1
}
```

Through a user interface, process execution can be viewed at a component-by-component granularity.

Figure 7:
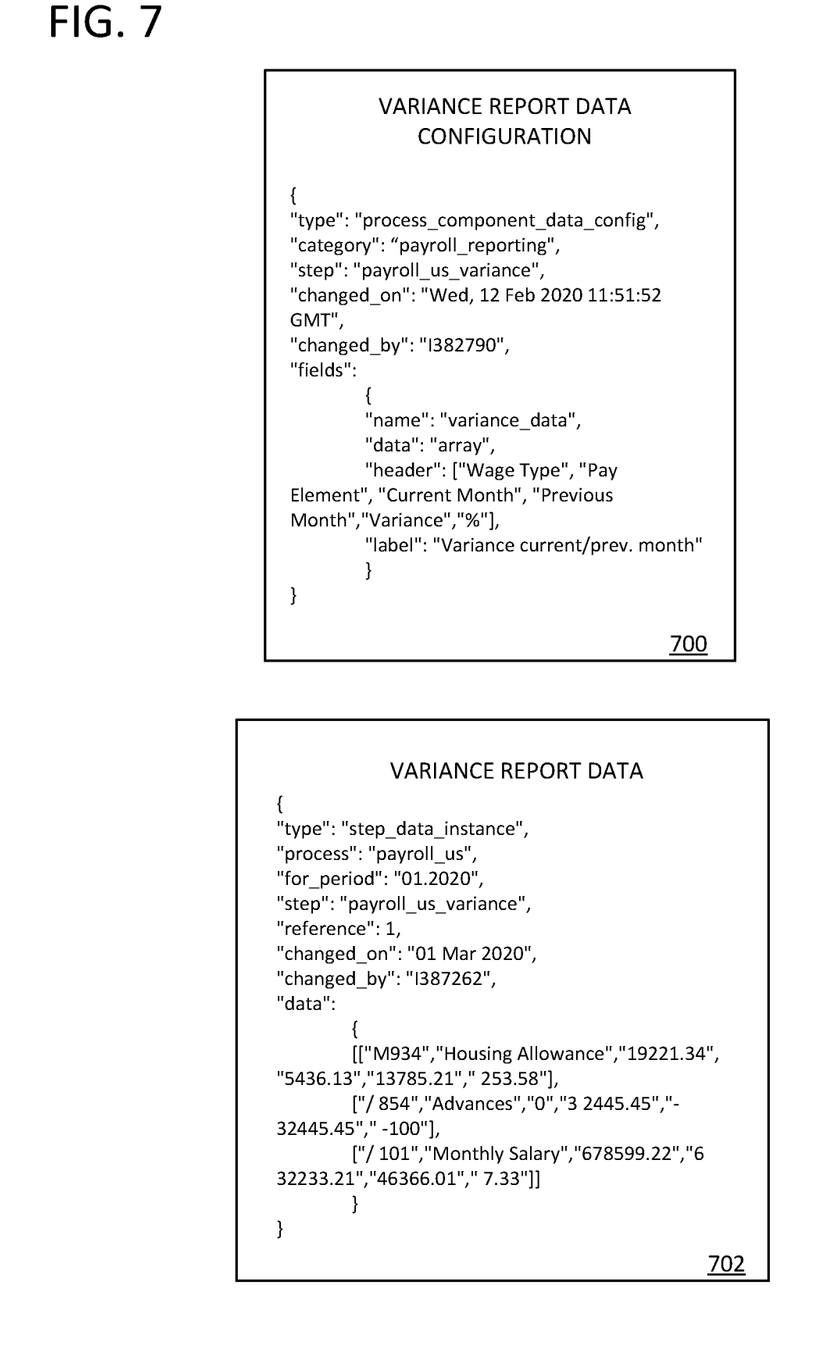
FIG. 7 illustrates example locally configured variance reporting configuration and data.

Process components that have been executed can also have an output (i.e., data for the process component). FIG. 7 illustrates an example process component data configuration 700 for a variance report. Configuration 700 is reproduced below for convenience:

```
{
"type": "process_component_data_config",
"category": "payroll_reporting",
"step": "payroll_us_variance",
"changed_on": "Wed, 12 Feb 2020 11:51:52 GMT",
"changed_by": "I382790",
"fields":
    {
    "name": "variance_data",
    "data": "array",
    "header": ["Wage Type", "Pay Element", "Current Month", "Previous Month","Variance","%"],
    "label": "Variance current/prev. month"
    }
}
```

Variance report data 702 includes the actual data identified in the variance report. Variance report data 702 is reproduced below:

```
{
"type": "component_data_instance",
"process": "payroll_us",
"for_period": "01.2020",
"step": "payroll_us_variance",
"reference": 1,
"changed_on": "01 Mar 2020",
"changed_by": "I387262",
"data":
    {
    [["M934","Housing Allowance", "19221.34", "5436.13", "13785.21","253.58],
    ["/ 854","Advances","0","3 2445.45","-32445.45","-100"],
    ["/ 101","Monthly Salary", "678599.22","632233.21","46366.01", "7.33"]]
    }
}
```

From variance report data 702, a variance report can be produced. An example variance report is illustrated in Table 1, below:

TABLE 1

Example Variance Report

| Wage Type | Pay Element | Cur. Month | Prev. Month | Variance | % |
|---|---|---|---|---|---|
| M934 | Housing Allowance | 19221.34 | 5436.13 | 13785.21 | 253.58 |
| /854 | Advances | 0 | 32445.45 | -32445.45 | -100 |
| /101 | Monthly Salary | 678599.22 | 632233.21 | 46366.01 | 7.33 |

Variance reports such as that shown in Table 1 can be used to identify unexpected variances in various parameters (e.g., greater than a 20% increase in housing allowance could trigger an alert). Variance reports can be provided to responsible parties (unit or subdivision managers, etc.) or can be provided to other applications to, e.g., freeze the payroll process for the relevant individual.

Figure 8:
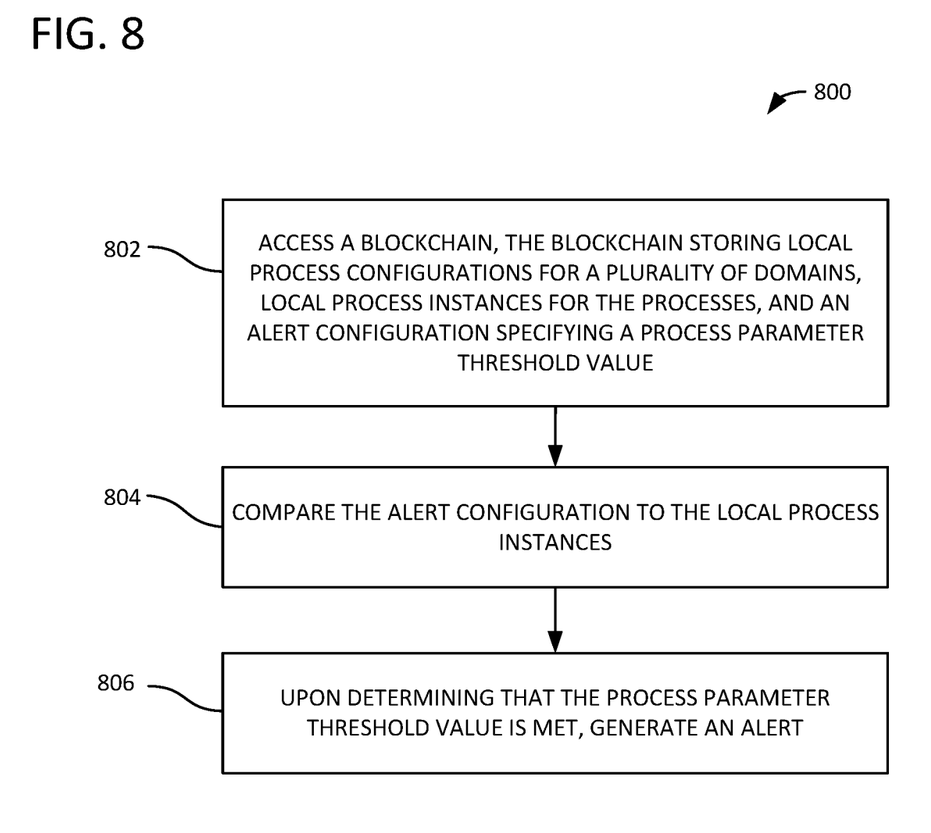
FIG. 8 illustrates an example method of generating an alert based on process instances of a locally configured process.

FIG. 8 illustrates an example method 800 of monitoring a process. In process block 802 (referring to process block of method 800, not of the monitored process), a blockchain is accessed. The blockchain stores local process configurations for processes of a plurality of domains. The respective process configurations define one or more process parameters. The blockchain also stores local process instances for the processes. The respective process instances describe an implementation of a process. The blockchain also stores an alert configuration specifying a process parameter threshold or condition value. In process block 804, the alert configuration is compared to the local process instances. In process block 806, upon determining that the process parameter threshold or condition value is met by a local process instance, an alert is generated.

Alerts can be implemented in a variety of manners, including generating the alert after parameters and thresholds/conditions are entered through a user interface of an analysis tool that accesses the blockchain. In other examples, such as method 800, alert configurations are established for various process parameters and stored in the blockchain. An example alert configuration is shown below:

An example alert configuration for the condition of current gross pay exceeding $500,000 is shown below:

```
{
"type": "alert",
"label": "Current gross larger than $500k",
```

-continued

```
"process": "payroll_us",
"step": "payroll_us_variance",
"changed_on": "Wed 01 Jan 2020 12:05:05 GMT",
"changed_by": "I387262",
"responsible_role": "Payroll Manager US",
"alert": {
    "key_column": "Wage Type",
    "key_value": "/101",
    "value_column": "Current Month",
    "operator": "GT",
    "compare_to": "500000"
    },
"valid_from": "01 Jan 2010",
"valid_to": "31 Dec 9999"
}
```

Alerts can also be generated for configurations rather than data. For example, if someone with access to the system changed configuration validity dates or other information, an alert can be established to monitor for such actions.

In some examples, Alerts can be approved, and the approval can be stored in the blockchain. For example, if an alert is generated but the alert was triggered because the master data was found to be incorrect after a review, the alert can be removed through approval. An example approval for this example is shown below:

{
"changed_by": "Payroll Admin US",
"changed_on": "2020-04-06 09:53:19.183484",
"index": 37,
"type": "approval",
"reason": "master data fixed"
}

Figure 9:
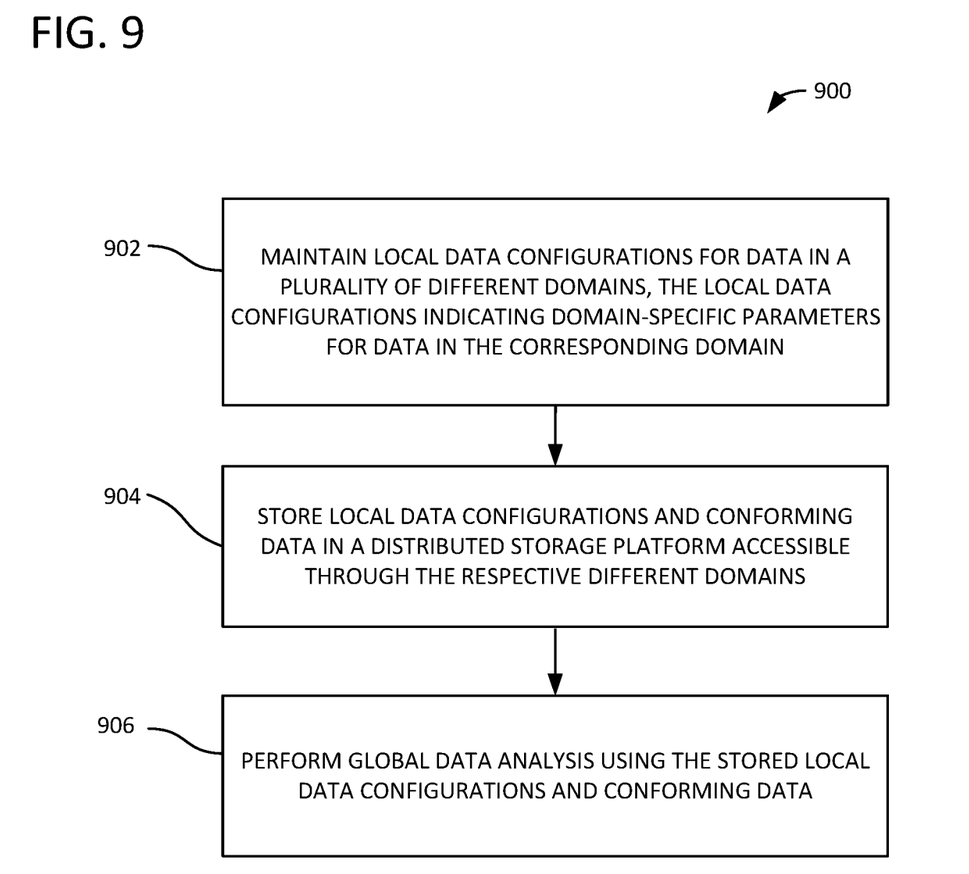
FIG. 9 illustrates an example method of analyzing locally configured data from multiple domains.

FIG. 9 illustrates a method 900 of analyzing locally configured data. In process block 902, local data configurations are maintained for data in a plurality of different domains. The respective local data configurations indicate domain-specific parameters for data in the corresponding domain. In process block 904, the local data configurations and data conforming to the local data configurations are stored in a distributed storage platform accessible through the respective different domains. The distributed storage platform can be, for example, a blockchain. In some examples, individual instances of the distributed storage platform are stored in the respective different domains (e.g., as shown in FIG. 3). In process block 906, using the stored local data configurations and data conforming to the local data configurations, a global data analysis is performed on the data in the plurality of different domains.

The described examples can implement various other scenarios. For example, an employee data service can be established so that an ex-employee can access their own data through an interface that accesses the blockchain. This provides the security necessary for storing and accessing employee data while allowing the employee to easily access even after leaving an organization. In another example, data mining and machine learning algorithms can be run against the locally configured data stored in the blockchain to enable fraud detection, budget predictions and analysis, etc.

Additional Recitations

A data structure, comprising: local data configurations for a plurality of domains, the respective configurations defining one or more data parameters of data of the corresponding domain; and data from the plurality of domains conforming to the respective configurations, wherein the data from the plurality of domains can be interpreted using the local data configurations, wherein the local data configurations and data from the plurality of domains are stored in a distributed storage platform.

The data structure, wherein the plurality of domains can correspond to different geographic areas.

The data structure, wherein the data structure further comprises: local process configurations for the plurality of domains, the respective process configurations defining one or more process parameters for processes of the corresponding domain; and a plurality of process instances for the respective local process configurations, wherein the local process configurations and the plurality of process instances are stored in the distributed storage platform.

The data structure having the local process configurations, wherein the data structure further comprises: local process component configurations for the respective process configurations, wherein the respective local processes have a plurality of process components, and a plurality of process component instances for the respective local process component configurations, and wherein the local process component configurations and the plurality of process instances are stored in the distributed storage platform.

Example Computing Systems

Figure 10:
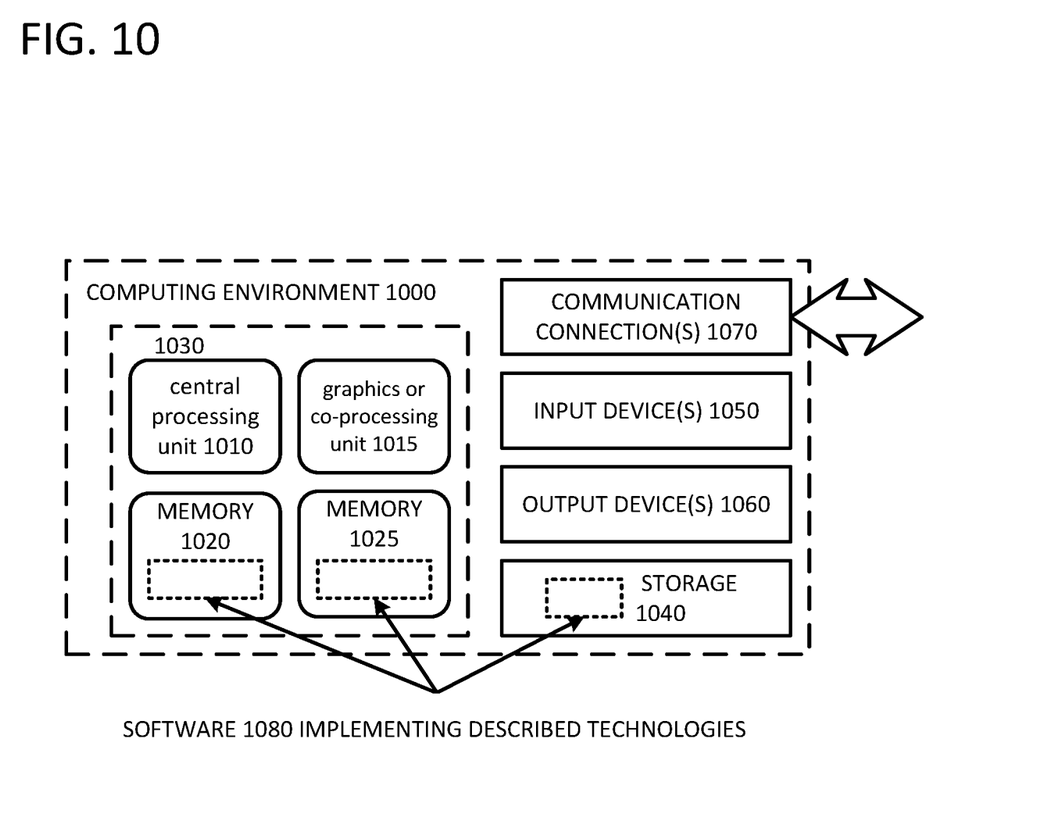
FIG. 10 is a diagram illustrating a generalized implementation environment in which some described examples can be implemented.

FIG. 10 depicts a generalized example of a suitable computing system 1000 in which the described innovations may be implemented. The computing system 1000 is not intended to suggest any limitation as to scope of use or functionality, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). For example, memory 1020 and 1025 can store blockchain instances 308, 316, 324, and 328 and global analysis tool 326 of FIG. 3.

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information and which can be accessed within the computing system 1000. The storage 1040 stores instructions for the software 1080 implementing one or more innovations described herein. For example, storage 1040 can store blockchain instances 308, 316, 324, and 328 and global analysis tool 326 of FIG. 3

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the

I claim:

1. A method, comprising:
   generating a first local data configuration for data items in a first domain, the first local data configuration specifying fields for the data items in the first domain;
   storing both the first local data configuration and data items from the first domain in a distributed storage platform, the data items from the first domain having values for the fields specified in the first local data configuration;
   generating a second local data configuration for data items in a second domain, the second local data configuration specifying fields for the data items in the second domain, wherein at least some of the fields of the second local data configuration are different from the fields of the first local data configuration;
   storing both the second local data configuration and data items from the second domain in the distributed storage platform, the data items from the second domain having values for the fields specified in the second local data configuration;
   accessing the distributed storage platform and performing a global analysis on the data items from the first domain and the data items from the second domain, wherein performing the global analysis comprises:
   evaluating the data items from the first domain using the first local data configuration; and
   evaluating the data items from the second domain using the second local data configuration; and
   generating an alert based on the global analysis.

2. The method of claim 1, wherein performing the global analysis further comprises based on evaluating the data items from the first and second domains, identifying data items of interest across the data items from both the first and second domains.

3. The method of claim 1, wherein the global analysis is initiated through a user interface of a central system associated with the first and second domains.

4. The method of claim 1, wherein the alert corresponds to identification of one or more parameters of the data items from the first or second domain that exceed a threshold or meet a condition.

5. The method of claim 1, wherein the alert is based on a calculation using one or more parameters of the data items from the first or second domains.

6. The method of claim 1, wherein the alert is provided through a user interface that accesses the distributed storage platform.

7. The method of claim 1, further comprising storing, in the distributed storage platform, an approval or a rejection of underlying data on which the alert is based.

8. The method of claim 1, wherein the first and second domains correspond to first and second geographic areas.

9. The method of claim 1, further comprising:
   generating a third local data configuration for data items in a third domain, the third local data configuration specifying fields for the data items in the third domain; and
   storing both the third local data configuration and data items from the third domain in the distributed storage platform, the data items from the third domain having values for the fields specified in the third local data configuration, and wherein the global analysis is performed on the data items from the first, second, and third domains.

10. The method of claim 1, wherein the distributed storage platform is a blockchain comprising a plurality of blocks.

11. The method of claim 10, wherein a user interface allows inspection of individual blocks of the plurality of blocks in the blockchain.

12. A system, comprising:
    at least one processor; and
    one or more computer-readable storage media storing computer-readable instructions that, when executed by the at least one processor, perform operations comprising:
    maintaining local data configurations for data items in a plurality of different domains, the respective local data configurations specifying fields for the data items in the corresponding domain;
    storing the local data configurations and data items from the plurality of different domains in a distributed storage platform accessible through the respective different domains, the data items from the respective domains having values for the fields specified in the corresponding local data configuration; and
    using the stored local data configurations and data items conforming to the local data configurations, performing a global data analysis on the data items in the plurality of different domains, wherein performing the global analysis comprises, for the respective different domains, evaluating the data items from the domain using the corresponding local data configuration.

13. The system of claim 12, wherein individual instances of the distributed storage platform are stored in the respective different domains.

14. The system of claim 12, wherein the operations further comprise maintaining local process configurations for the plurality of domains and storing the local process configurations, along with corresponding local process instances, in the distributed storage platform.

15. The system of claim 12, wherein the operations further comprise generating an alert based on the global analysis.

16. One or more computer-readable storage media storing computer-executable instructions for monitoring a process, the monitoring comprising:
    accessing a distributed storage platform, the distributed storage platform storing:
    local process configurations for processes of a plurality of domains, the respective process configurations defining one or more process parameters, the one or more process parameters including a process status parameter, wherein the process status parameters for at least two of the plurality of domains are different;
    local process instances for the processes, the respective process instances describing an implementation of a process and having a value for the process status parameter; and
    one or more alert configurations specifying a process status parameter threshold or condition value;
    comparing the one or more alert configurations to the local process instances; and
    upon determining that the process status parameter threshold or condition value is met by a local process instance, generating an alert.

17. The computer-readable storage media of claim 16, wherein the monitoring further comprises upon receiving an indication that the alert has been approved, adding an indication of approval to the distributed storage platform referencing the alert.

18. The computer-readable storage media of claim 16, wherein the alert configuration corresponds to a particular process component of the local process instances, and wherein comparing the alert configuration to the local process instances comprises comparing the alert configuration to the particular process component.

\* \* \* \* \*